106. COMPOSITIONS, COATING OR PLASTIC.

Patented Oct. 21, 1930

1,779,183

UNITED STATES PATENT OFFICE

ROBERT Q. McGREGOR, OF OAKLAND, CALIFORNIA

COMPOSITION

No Drawing.     Application filed May 9, 1927.   Serial No. 190,135.

My invention relates to improvements in compositions, and it consists in the steps hereinafter described and claimed.

It has been known that the spawn from barnacles rises to the surface of the water and drifts around until it contacts with an object, such as a pile, the bottom of a vessel, etc. As soon as the spawn strikes the article it clings to it and grows and of course obtains its food from the article itself.

The principal object of my present invention is to provide a paint which will exude a poisonous substance that will kill the spawn and thus prevent the barnacles from growing on the object which has thus been painted.

A further object of my invention is to provide a composition which is poisonous to barnacles and which is in the form of a paint which may be applied to the necessary object by a brush, in the same manner as a house is painted, or the like.

Other objects and advantages will appear in the following specification, and the novel features of my invention will be particularly pointed out in the appended claims.

The composition consists of white lead, lead oxide, Paris green, gylcerine and linseed oil. The proportions of these different ingredients for making a composition having the proper constituency are as follows:

100 parts white lead.
75 parts lead oxide.
25 parts Paris green.
25 parts glycerine.
Enough linseed oil to make a spreading mixture.

The white lead, lead oxide, Paris green and the linseed oil are mixed together in the preparation of the composition, and enough oil is added to make a heavy paste. The glycerine is now added to thin out the paste sufficiently so that the composition can be spread upon the surface like an ordinary paint. Moreover, the glycerine performs an additional function in that it prevents the composition from hardening in the same manner as a paint does and permits the lead oxide and Paris green to slowly seep out and surround the article so as to kill any barnacle spawn which may be floating in the neighborhood of the article. This seepage of the poison is so slow that an article examined four years after it was painted still contained a good coating of the composition and had effectually kept the barnacles off from the article during this period.

I claim:

1. An antifouling or insecticidal paint composition consisting of white lead, lead oxide, Paris green, glycerine, and linseed oil.

2. An antifouling or insecticidal paint composition consisting of 100 parts of white lead, 75 parts of lead oxide, 25 parts of Paris green, 25 parts of glycerine, and enough linseed oil to make a spreading mixture.

3. An insecticidal paint for use under water comprising lead oxide and Paris green and glycerine for keeping them in a softened condition for permitting them to slowly seep out into the water.

ROBERT Q. McGREGOR.